Patented May 2, 1939

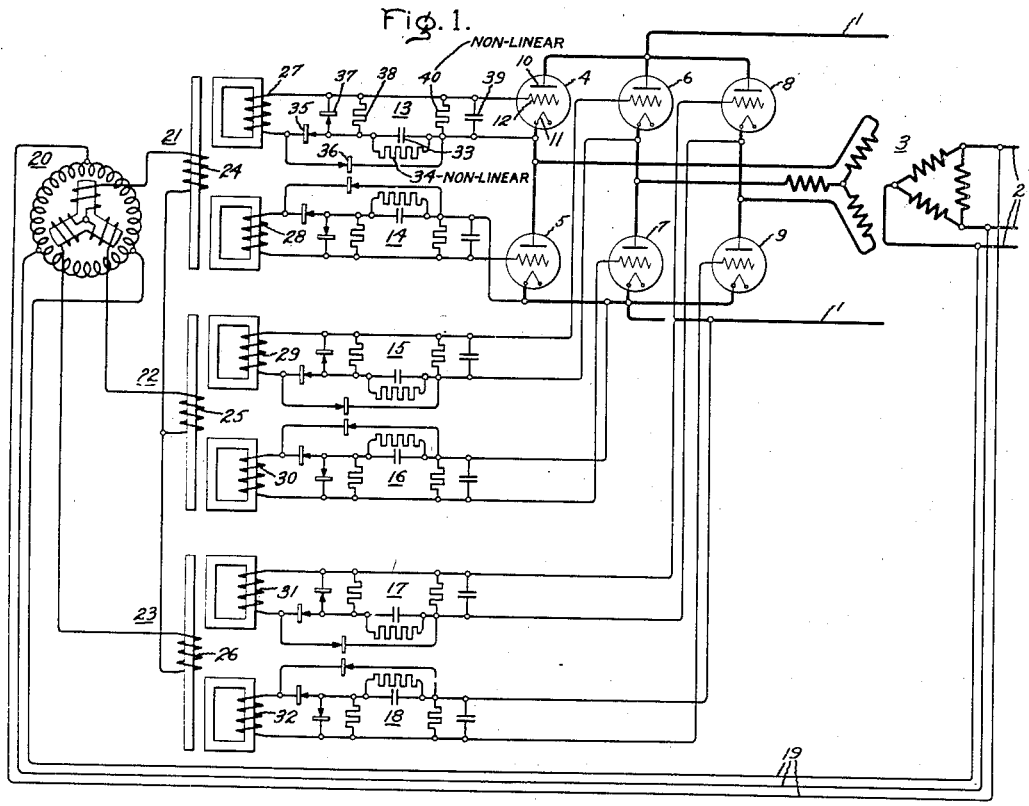
Inventor:
Burnice D. Bedford,
by Harry E. Dunham
His Attorney.

2,156,959

UNITED STATES PATENT OFFICE 2,156,959

ELECTRIC VALVE CIRCUITS

Burnice D. Bedford, Schenectady, N. Y., assignor to General Electric Company, a corporation of New York Application July 3, 1936, Serial No. 88,826

15 Claims. (Cl. 175—363)

My invention relates to electric valve translating apparatus and more particularly to control or excitation circuits for electric valves.

In electric valve circuits, particularly in those circuits including electric valves of the type employing ionizable mediums such as gases or vapors, it is advantageous to provide control circuits which supply biasing voltages of a predetermined magnitude and which will maintain the biasing voltage within a predetermined range of values irrespective of the condition of operation of the main electric valve circuit. Many of the prior art arrangements have employed separate sources of potential, such as batteries, to provide this essential biasing voltage. However, with the increasing use of electric valves in power applications, where reliability of operation and continuity of service are important factors, it has become evident that it is highly desirable to use control circuits which require little inspection and which require few renewals or replacements. Heretofore, where control circuits of the self-biasing type have been used to control electric valves having ionizable mediums, the circuits have failed to maintain a satisfactory negative biasing voltage under adverse operating conditions. For example, when the main or power valve means was required to conduct current for a period substantially in excess of the normal period of conduction, many of the prior art control circuits failed to maintain the required negative biasing potential, thereby incurring loss of control and in many instances effecting an interruption of service.

It is an object of my invention to provide a new and improved electric valve translating circuit which obviates the above-mentioned difficulties.

It is another object of my invention to provide a new and improved control or excitation circuit for electric valves.

It is a further object of my invention to provide a new control circuit for electric valves which will maintain a satisfactory negative biasing voltage under adverse operating conditions.

In accordance with the illustrated embodiments of my invention, I provide control or excitation circuits for electric valves which will maintain a satisfactory negative biasing voltage under adverse operating conditions. A self-biasing type of control circuit is employed, including means such as a source of alternating potential and a capacitance connected in the control circuit to impress on the control member a negative biasing potential. The capacitance is charged during the half cycles when positive potentials are impressed on the control member. To maintain the negative biasing potential within predetermined limits, the capacitance is also charged during the negative half cycles of potential through a suitably connected circuit including a unidirectional conducting device. An impedance having a non-linear impedance-current characteristic is connected across the capacitance to cooperate with the unidirectional conducting device to maintain the negative biasing voltage within a predetermined range of values.

Another embodiment of my invention provides a control circuit of the self-biasing type in which two sources of potential, preferably 180° out of phase, serve to maintain a biasing capacitance charged. One source is connected in series relation with the control member of the electric valve and the biasing capacitance and charges the capacitance during positive half cycles of potential. The other source is arranged to charge the capacitance through a unidirectional conducting device during the positive half cycles of potential of that source, serving as a means for maintaining a substantially constant biasing potential.

In connection with a further embodiment of my invention, a pair of serially-connected capacitances are connected in series relation with a control member of an electric valve to be controlled, and an impedance is connected in series with the capacitance and the control member. One of the capacitances is charged during the positive half cycles of potential impressed on the control member to impress a negative biasing potential on the control member, and the other of the capacitances is arranged to be charged during the negative half cycles to maintain the negative biasing potential substantially constant.

For a better understanding of my invention, reference may be had to the following description taken in connection with the accompanying drawing and its scope will be pointed out in the appended claims.

Figure 1 represents a general view of an embodiment of my invention.

Figures 2 and 3 represent modifications of the control circuit shown in Figure 1.

Referring to Fig. 1 of the accompanying drawing, my invention is diagrammatically shown as applied to an electric valve translating circuit for transmitting energy between a direct current circuit 1 and an alternating current circuit 2. A transformer 3 and an electric valve aggregate including electric valves 4–9, inclusive, preferably of the type employing ionizable mediums such as gases or vapors, serve to transmit energy between the circuits. Each of the electric valves 4–9, inclusive, is provided with an anode 10, a cathode 11 and a control member 12 and each furnishes an arc discharge path.

Control or excitation circuits 13–18, inclusive, are associated with electric valves 4–9, respectively, and are employed to control the conductivity of these valves and are arranged to render these valves conductive in a predetermined order. These excitation circuits are arranged to maintain a substantially constant negative biasing potential. The control circuits 13–18 may be energized from any suitable source of polyphase alternating potential, and for the purpose of illustrating my invention I have shown these circuits as being energized from the alternating current circuit 2, through conductors 19, any conventional phase shifting arrangement, such as the rotary phase shifter 20, and transformers 21–23. Transformers 21–23, preferably of the type designed to supply a voltage of peaked wave form of substantially perpendicular wave front, are provided with primary windings 24–26, respectively, and secondary windings 27 and 28, 29 and 30, and 31 and 32, respectively. Control circuits 13–18 are connected to secondary windings 27–32, respectively, and impress alternating potentials upon the respective control circuits.

Each of the control circuits 13–18, includes a biasing means such as a capacitance 33 connected in series relation with the control member 12 of the associated electric valve 4. An impedance 34, having a non-linear negative impedance-current characteristic is connected across the capacitance 33 and serves to control the maximum value of the negative biasing potential supplied by the capacitance 33. The impedance 34 may be of the material described and claimed in U. S. Patent 1,822,742, granted September 8, 1931, on an application of K. B. McEachron and assigned to the assignee of the present application. The capacitance is charged by means of secondary winding 27 during positive half cycles of potential through the electric valve 4 and a unidirectional conducting device 35 which is connected in series relation with winding 27 and capacitance 33. The unidirectional conducting device 35 prevents the capacitance 33 from discharging during negative half cycles of potential. During negative half cycles of potential, the capacitance 33 is charged from the secondary winding 27 of transformer 21 through a circuit including a unidirectional conducting device 36, connected across device 35 and capacitance 33, and a third unidirectional conducting device 37 which is connected in series relation with device 36 and capacitance 33 and serves as a return path for the current supplied to capacitance 33 during the negative half cycles. It will be noted that the unidirectional conducting devices 35 and 36 are oppositely disposed relative to each other. The negative biasing potential effected by capacitance 33 is impressed on control member 12 of electric valve 4 through an impedance element 38, which may be a resistance and which serves to control the flow of control member current incident to the deionization of the medium of electric valve 4.

A capacitance 39 and a resistance 40 are connected across the cathode 11 and the control member 12 of the associated electric valve 4 to suppress high voltage transients. The resistance 40 may be of the type having a negative non-linear impedance-current characteristic.

The operation of the embodiment of my invention diagrammatically shown in Fig. 1 may be explained by considering the electric valve translating apparatus shown therein when energy is being transmitted from the direct current circuit 1 to the alternating current circuit 2. As is well understood by those skilled in the art, electric valves 4–9 will conduct current in a predetermined order, each valve conducting current for substantially 120 electrical degrees during each cycle of alternating potential but each valve conducts current for only 60 electrical degrees with any one of the oppositely disposed electric valves. Control circuits 13–18 render the valves conductive in a predetermined order and effect deionization of the associated electric valve. It is to be understood that in electric valves of this type, the valves are rendered non-conductive by impressing on the anode a potential less positive than the cathode for a time equal to or greater than the time of deionization for the particular valve employed. In the arrangement shown in Fig. 1 the valves will each conduct for substantially 120 electrical degrees and the current will be commutated from one valve to another due to the phase rotation of the potentials of the polyphase alternating current circuit 2, or in any other conventional manner.

For the purpose of explaining the operation of the control circuits 13–18, circuit 13 will be considered in particular. An alternating potential, preferably of peaked wave form, is impressed on control circuit 13 by secondary winding 27 of transformer 21. Positive half cycles of potential are impressed on control member 12 to render electric valve 4 conductive at the proper instant. During the intervals in which a positive potential is impressed on control member 12 current flows from the upper terminal of secondary winding 27, through electric valve 4 by means of control member 12 and cathode 11, capacitance 33 and unidirectional conducting device 35 back to secondary winding 27. This flow of current establishes a positive charge on the right-hand plate of capacitance 33 and, of course, coincidentally renders the left-hand plate of this capacitance negative relative to the cathode 11 of electric valve 4. This negative potential is impressed on control member 12 through impedance element 38, thereby rendering the control member 12 negative relative to the cathode 11. So long as the medium of the electric valve 4 is in an ionized condition, a relatively negative potential impressed on the control member 12 will cause a current to flow in the control circuit. This current flows in a direction opposite to that of the normal control member current and is sometimes referred to as "positive ion current", but actually is an electron current which flows in the circuit as a result of the ionized medium in the valve. Referring to control circuit 13 of Fig. 1, this current will flow from control member 12 to cathode 11 of electric valve 4 through impedance element 38 and capacitance 33. The net effect of the current which flows due to the ionized medium is to effect a reduction in the negative biasing potential established by capacitance 33. Therefore, it will be understood that under conditions where an electric valve is required to conduct current for an extended period, the prior art arrangements may fail to maintain a sufficiently large negative biasing voltage thereby preventing the control member 12 from regaining control at the proper time.

During negative half cycles of the potential appearing across the terminals of secondary winding 27, that is when the lower terminal of winding 27 is positive relative to the upper terminal, the capacitance will be charged through a circuit including winding 27, unidirectional conducting device 36, capacitance 33, unidirectional conducting device 37 and winding 27. During these intervals the current which flows tends to maintain the negative biasing potential established during the positive half cycles. The non-linear impedance 34, which previously has not been considered, is proportioned so that during normal operation when the negative biasing potential is in a predetermined range, substantially no current will flow through the impedance. However, if the negative biasing potential increases to a predetermined maximum value, the negative non-linear impedance-current characteristic of this impedance is effective to reduce the biasing potential to a predetermined maximum value. By choosing a suitable value for the non-linear resistance 34, the resistance 34 acts as a shunt circuit to limit the maximum negative biasing potential. Under normal operating conditions the "positive ion current" will be relatively small so that the resistance 34 will conduct a relatively large current. However, under abnormal operating conditions when the "positive ion current" increases, the resistance 34 will conduct a smaller current due to the non-linear characteristic and reduction of voltage. The resistance 34 acts in conjunction with the unidirectional conducting devices 36 and 37 to control the negative biasing potential. In this manner the control circuits supply a substantially constant negative biasing potential to the control members of the associated electric valves.

Fig. 2 of the accompanying drawing shows a modified embodiment of my invention which is similar to the control circuits of Fig. 1 and corresponding elements have been assigned like reference numerals. A transformer 41, preferably of the type designed to supply a voltage of peaked wave form, is provided with a primary winding 42 and secondary windings 43 and 44. The secondary winding 42 is provided with an electrically intermediate tap connection 45 to make available two sources of alternating potential for the control circuit. Other means, such as a transformer with separate secondary windings may be employed to furnish two sources of alternating potential. The upper terminal of secondary winding 43 is connected to control member 12 through an impedance 46, which may be a resistance of suitable value. The connection 45 of winding 43 is connected to the cathode 11 of electric valve 12 through biasing capacitance 33. Any conventional unidirectional conducting device 47, such as a contact rectifier, is connected between the lower terminal of secondary winding 43 and the right-hand plate of capacitance 33, and serves to supply current to the capacitance 33 during the intervals when the lower terminal of winding 43 is positive relative to the connection 45.

The principles of operation of the embodiment of my invention shown in Fig. 2 are substantially the same as explained in connection with the arrangement shown in Fig. 1. During positive half cycles of potential appearing across the terminals of winding 43, that is when the upper terminal is positive relative to the connection 45, a positive potential will be impressed on the control member 12 of electric valve 4 through impedance 46, thereby rendering the valve 4 conductive. The circuit through which this current flows includes impedance 46, control member 12 and cathode 11 of electric valve 4, capacitance 33 and the upper part of secondary winding 43. This current establishes a positive charge on the right-hand plate of capacitance 33, and the capacitance 33 impresses a negative biasing potential on the control member 12 through the upper part of winding 43 and impedance 46. The capacitance 33 is also charged during those intervals in which the lower terminal of winding 33 is positive relative to the connection 45. Since the potentials of the upper and lower terminals of winding 43 relative to the potential of mid-connection 45 are 180 electrical degrees out of phase, the capacitance 33 is charged from the lower part of winding 43 through unidirectional conducting device 47 during alternate half cycles of potential when the capacitance 33 is not being charged from the upper part of winding 43. The non-linear impedance element 34 serves to control the maximum value of the biasing voltage. In this manner, the control circuit shown in Fig. 2 serves to maintain a negative biasing potential of a substantially constant magnitude, thereby compensating for the reduction of negative biasing potential occasioned by the flow of the current incident to the deionization of the medium in electric valve 4.

Another embodiment of my invention is diagrammatically shown in Fig. 3. This arrangement is quite similar to the control circuits of Figs. 1 and 2 and corresponding elements have been assigned like reference numerals. A transformer 48, having a primary winding 49 and secondary windings 50 and 51, and preferably of the type designed to furnish a voltage of peaked wave form, is used to energize the control circuit. In order to impress on the control member 12 a negative biasing potential, I employ a pair of serially-connected capacitances 52 and 53. These capacitances are arranged in series relation with an impedance 54 and control member 12 of electric valve 4. A unidirectional conducting device 55 is connected in series relation with secondary winding 50, control member 12 and cathode 11 of electric valve 4 and capacitance 52 and provides a low impedance path for the normal control member current. To provide a circuit for controlling the negative biasing potential, I employ a unidirectional conducting device 56 connected between the upper terminal of winding 50 and the common connection of impedance 54 and capacitance 53. The unidirectional conducting device 56 provides a path for charging the capacitance 53 from the secondary winding 50 during those half cycles when the potential of the lower terminal of winding 50 is positive relative to the upper terminal.

In considering the operation of the embodiment of my invention shown in Fig. 3, it will be assumed that the potential of the upper terminal of secondary winding 50 is positive relative to the lower terminal and that a potential of peaked wave form is impressed on the control member 12 of electric valve 4 to render the valve conductive. The circuit through which this current flows includes unidirectional conducting device 54, control member 12 and cathode 11 of electric valve 4, capacitance 52 and secondary winding 50 of transformer 48. By virtue of this current a negative charge is established on the left-hand plate of capacitance 52 and this negative potential is impressed on control member 12 through capacitance 53 and impedance 54.

As a result of the presence of the ionized medium in electric valve 4 and due to this negative biasing potential, a "positive ion current" flows in the control circuit in a direction tending to reduce the biasing potential. This "positive ion current" flows in a circuit including a control member 12, impedance 54, capacitances 53 and 52 and cathode 11 of electric valve 4.

During negative half cycles of potential, that is when the lower terminal of winding 50 is positive relative to the upper terminal, the negative biasing potential is controlled by means of the unidirectional conducting device 56 which serves to charge the capacitance 53 from the secondary winding 50. In this manner, the potential appearing across the capacitance 53 is controlled to effect a control of the negative biasing potential impressed on the control member 12 of electric valve 4. The linear impedance element 54, which is connected across the unidirectional devices 55 and 56, serves to limit the negative biasing potential to a predetermined maximum value. This impedance element cooperates with the unidirectional conducting device 56 to control the negative biasing potential and by choosing a suitable value for the impedance element 54 the negative biasing potential may be maintained within a predetermined range of values.

The above described circuits embodying my invention provide satisfactory arrangements for assuring positive and reliable control of electric valves operating under adverse conditions. For example, if for some reason the associated electric valves are required to conduct extremely large overload currents, effecting thereby a substantial increase in the ionization of the ionizable medium, these circuits will respond to maintain the negative biasing potential substantially constant assuring positive control. Furthermore, if the associated electric valve experiences an arc-back condition resulting in intensive ionization of the medium, the control circuit associated with the valve will rapidly deionize the medium without involving a material reduction in the value of the negative biasing potential.

While I have shown and described my invention as applied to a particular system of connections and embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric valve means having a control member and employing an ionizable medium, and a control circuit for energizing said control member comprising a source of alternating potential, a resistance connected in said control circuit for controlling the current incident to the deionization of said medium, a capacitance connected in series with said control member and said resistance and arranged to be energized from said source during positive half cycles of potential for impressing on said control member a negative biasing potential and a unidirectional conducting device for charging said capacitance from said source during negative half cycles of potential to maintain said negative biasing potential within a predetermined range of values.

2. In combination, an electric valve having a control member, and a control circuit for energizing said control member comprising a source of alternating potential, a capacitance connected in said control circuit for impressing on said control member a negative biasing potential and arranged to be charged from said source during positive half cycles of potential and means for maintaining said negative biasing potential substantially constant including a unidirectional conducting device for charging said capacitance from said source during negative half cycles of potential.

3. In combination, an electric valve having a control member and employing an ionizable medium, and a control circuit for energizing said control member comprising a source of alternating potential, a capacitance arranged to be charged from said source during positive half cycles of said potential when said source impresses positive potentials on said control member and connected to impress a negative biasing potential on said control member, an impedance element connected in series relation with said capacitance and said control member to control the current in said control circuit incident to the deionization of said medium and means for charging said capacitance from said source during negative half cycles of potential to maintain said negative biasing potential substantially constant.

4. In combination, an electric valve having a control member, and a control circuit for energizing said control member comprising a source of alternating potential, a capacitance connected in series relation with said control member and arranged to be charged during positive half cycles of said potential when said source impresses positive potentials on said control member and connected to impress a negative biasing potential on said control member, means for charging said capacitance from said source during negative half cycles of potential of said source and means comprising a resistance element having a non-linear impedance-current characteristic connected across said capacitance for limiting said negative biasing potential to a predetermined maximum value.

5. In combination, an electric valve having a control member, and a control circuit for energizing said control member comprising a source of alternating potential, a serially-connected unidirectional conducting device and a capacitance, said capacitance being connected in said control circuit to impress on said control member a negative biasing potential and arranged to be charged from said source during positive half cycles of potential, a unidirectional conducting device connected across said first-mentioned unidirectional conducting device and said capacitance for charging said capacitance during the negative half cycles of potential to maintain said negative biasing potential substantially constant.

6. In combination, an electric valve having a control member, and a control circuit for energizing said control member comprising a source of alternating potential, a unidirectional conducting device, a capacitance connected in series relation with said control member and said unidirectional conducting device and arranged to be charged during positive half cycles of potential, said capacitance being connected to impress a negative biasing potential on said control member and means including a pair of unidirectional conducting devices connected in series relation with said capacitance for charging said capacitance from said source during negative half cycles of potential to maintain said negative biasing potential substantially constant.

7. In combination, an electric valve having a control member, and a control circuit for energizing said control member comprising a source of alternating potential, a serially-connected unidirectional conducting device and a capacitance, said capacitance being connected in said control circuit to impress on said control member a negative biasing potential and arranged to be charged through said device from said source during positive half cycles of potential, and means for charging said capacitance from said source during negative half cycles of potential including a second unidirectional conducting device connected across said first-mentioned unidirectional conducting device and said capacitance and a third unidirectional conducting device connected to provide a return path for the current supplied to said capacitance during the negative half cycles of potential.

8. In combination, an electric valve means having a control member, a pair of sources of alternating potentials, a control circuit connected to one of said sources for energizing said control member comprising a capacitance connected in said control circuit in series relation with said control member and arranged to be charged from said one of said sources for impressing on said control member a negative biasing potential, and means associated with the other of said sources for charging said capacitance from said other of said sources.

9. In combination, an electric valve means having a control member, a pair of sources of alternating potentials, the potentials of said sources being substantially 180 electrical degrees out of phase, a control circuit connected to one of said sources for energizing said control member comprising a capacitance connected in said control circuit in series relation with said control member and arranged to be charged during positive half cycles of potential of said one of said sources, an impedance element having a non-linear impedance-current characteristic connected across said capacitance, and means including a unidirectional conducting device associated with the other of said sources for charging said capacitance during the positive half cycles of potential of said other of said sources.

10. In combination, an electric valve means having a control member, two sources of alternating potentials, the potentials of said sources being substantially 180 electrical degrees out of phase, a control circuit connected to one of said sources for energizing said control member comprising a capacitance connected in said control circuit in series relation with said control member and arranged to be charged during positive half cycles of potential of said one of said sources for impressing on said control member a negative biasing potential, and means for maintaining said negative biasing potential within a predetermined range of values comprising a resistance having a non-linear impedance-current characteristic connected across said capacitance and a unidirectional conducting device associated with the other of said sources for charging said capacitance during positive half cycles of potential of said other of said sources.

11. In combination, an electric valve means having a control member, a pair of sources of alternating potentials, the potentials of said sources being substantially 180 electrical degrees out of phase, a control circuit connected to one of said sources for energizing said control member comprising an impedance element in series relation with said control member for limiting the current in said control circuits, a capacitance connected in said control circuit in series relation with said control member and arranged to be energized from said one of said sources during positive half cycles of potential for impressing on said control member a negative biasing potential, and means for maintaining said negative biasing potential within a predetermined range of values including a resistance having a non-linear, impedance-current characteristic connected across said capacitance and a unidirectional conducting device associated with the other of said sources for charging said capacitance during positive half cycles of potential of said other of said sources.

12. In combination, an electric valve means having a control member, and a control circuit for energizing said control member comprising a source of alternating potential and a pair of serially-connected capacitances connected in said control circuit in series relation with said control member, one of said capacitances being arranged to be charged from said source during positive half cycles of potential for impressing a negative biasing potential on said control member through the other of said capacitances and means for charging said other of said capacitances from said source during the negative half cycles of potential to maintain said negative biasing potential substantially constant.

13. In combination, an electric valve means having a control member and employing an ionizable medium, and a control circuit for energizing said control member comprising a source of alternating potential, means including a unidirectional conducting device in series relation with said control member for permitting the flow of normal control member current during positive half cycles of potential, a capacitance connected in series relation with said unidirectional conducting device and said control member and arranged to be charged from said source during positive half cycles of potential to impress on said control member a negative biasing potential, means including a second capacitance connected in series relation with said first-mentioned capacitance for controlling said negative biasing potential and means for charging said second capacitance from said source during negative half cycles of potential.

14. In combination, an electric valve means having a control member and employing an ionizable medium, and a control circuit for energizing said control member comprising a source of alternating potential, a capacitance connected in series relation with said control member and arranged to be charged during positive half cycles of potential of said source for impressing on said control member a negative biasing potential, a resistance for limiting the current in said control circuit incident to the deionization of said medium, a second capacitance connected between said first-mentioned capacitance and said resistance and means including a unidirectional conducting device for charging said second capacitance during negative half cycles of potential of said source to maintain said negative biasing potential substantially constant.

15. In combination, a supply circuit, a load circuit, electric translating apparatus interconnecting said circuits including an electric valve means having a control member and employing an ionizable medium, and a control circuit for energizing said control member to render said electric valve means conductive during predetermined intervals comprising a source of alternating potential, a resistance connected in said control circuit for limiting the flow of current incident to the deionization of said control member, a capacitance connected in series with said control member and said resistance and arranged to be energized from said source during positive half cycles of potential for impressing on said control member a negative biasing potential and a unidirectional conducting device for charging said capacitance during negative half cycles of potential of said source to maintain said negative biasing potential within a predetermined range of values.

BURNICE D. BEDFORD.